United States Patent
Khalouf et al.

(10) Patent No.: US 9,014,571 B2
(45) Date of Patent: Apr. 21, 2015

(54) SMALL FORM PLUGGABLE ANALOG OPTICAL TRANSMITTER

(75) Inventors: Ihab E. Khalouf, Allentown, PA (US); Philip Miguelez, Warminster, PA (US); Alfred J. Slowik, Lansdale, PA (US)

(73) Assignee: ARRIS Technology, Inc., Suwanee, GA (US)

( * ) Notice: Subject to any disclaimer, the term of this patent is extended or adjusted under 35 U.S.C. 154(b) by 0 days.

(21) Appl. No.: 11/555,341

(22) Filed: Nov. 1, 2006

(65) Prior Publication Data

US 2008/0101801 A1    May 1, 2008

(51) Int. Cl.
| | |
|---|---|
| *H04B 10/58* | (2013.01) |
| *H04B 10/2575* | (2013.01) |
| *H04B 10/564* | (2013.01) |
| *H04B 10/50* | (2013.01) |

(52) U.S. Cl.
CPC .......... *H04B 10/58* (2013.01); *H04B 10/25754* (2013.01); *H04B 10/504* (2013.01); *H04B 10/564* (2013.01)

(58) Field of Classification Search
USPC ............. 398/186, 192–194; 372/38.02, 38.08
See application file for complete search history.

(56) References Cited

U.S. PATENT DOCUMENTS

| | | | |
|---|---|---|---|
| 4,786,064 A | 11/1988 | Baghdasarian | |
| 5,920,460 A | 7/1999 | Oldendorf et al. | |
| 5,953,690 A | 9/1999 | Lemon et al. | |
| 6,163,395 A | 12/2000 | Nemecek et al. | |
| 6,263,136 B1 | 7/2001 | Jennings et al. | |
| 6,881,095 B2 * | 4/2005 | Murr et al. | 439/607 |
| 6,934,310 B2 * | 8/2005 | Brophy et al. | 372/38.02 |
| 7,076,146 B2 | 7/2006 | Sufleta et al. | |
| 7,135,697 B2 | 11/2006 | Friesen et al. | |
| 7,197,225 B2 | 3/2007 | Romo et al. | |
| 7,483,205 B1 | 1/2009 | Lundquist et al. | |
| 2002/0031324 A1 | 3/2002 | Cao et al. | |
| 2002/0196509 A1 | 12/2002 | Smilanski et al. | |
| 2002/0199210 A1 | 12/2002 | Shi et al. | |
| 2003/0002115 A1 | 1/2003 | Schemmann et al. | |
| 2003/0020979 A1 | 1/2003 | Bell | |
| 2003/0161026 A1 | 8/2003 | Qin et al. | |
| 2004/0037537 A1 | 2/2004 | Chown | |
| 2004/0109661 A1 | 6/2004 | Bierman et al. | |
| 2005/0025504 A1 | 2/2005 | Huang et al. | |

(Continued)

FOREIGN PATENT DOCUMENTS

WO    2008/057904 A2    5/2008

OTHER PUBLICATIONS

Small Form-Factor Pluggable (SFP) Transceiver Multisource Agreement (MSA), Sep. 14, 2000.

(Continued)

*Primary Examiner* — Nathan Curs
(74) *Attorney, Agent, or Firm* — Lori Anne D. Swanson

(57) ABSTRACT

A pluggable small form factor optical transmitter is described. The optical transmitter can be plugged into an optical transmission unit which may hold many optical transmitters. The optical transmitter includes an analog laser for QAM transmissions, a TEC driver, pre-distortion circuitry, a microprocessor, and an automatic power control circuit and dither tone level control capability. The optical transmitter may have receptacle optical ports such as LC or SC type, also it may include a pin connector for mating with the optical transmission unit and a latch mechanism to secure the optical transmitter in the optical transmission unit.

17 Claims, 4 Drawing Sheets

(56) References Cited

U.S. PATENT DOCUMENTS

| | | | |
|---|---|---|---|
| 2005/0053319 | A1 | 3/2005 | Doan |
| 2005/0157987 | A1 | 7/2005 | Dodds et al. |
| 2005/0245109 | A1 | 11/2005 | Torres et al. |
| 2006/0034619 | A1 | 2/2006 | Day |
| 2006/0256521 | A1 | 11/2006 | Yee et al. |
| 2007/0092262 | A1* | 4/2007 | Bozarth et al. ............... 398/159 |
| 2008/0095539 | A1 | 4/2008 | Khalouf et al. |
| 2008/0273561 | A1* | 11/2008 | Fu et al. ...................... 372/34 |

OTHER PUBLICATIONS

Office Action mailed on May 11, 2011 in Mexican Patent Application No. MX/a/2009/004504.

Office Action mailed on Jun. 29, 2012 in Canadian Patent Application No. CA 2667646.

Notice of Allowance mailed on Jun. 18, 2013 in Canadian Patent Application No. CA 2667646.

International Search Report with written opinion for International Application No. PCT/US2007/083279 mail on Apr. 10, 2008.

* cited by examiner

SMALL FORM PLUGGABLE ANALOG OPTICAL TRANSMITTER

FIELD OF INVENTION

The present invention relates to an analog optical transmitter. More precisely, the present invention relates to a small form factor pluggable analog optical transmitter.

BACKGROUND

Coaxial cable television systems have been in widespread use for many years and extensive networks have been developed. The extensive and complex networks are often difficult for a cable operator to manage and monitor. A typical cable network generally contains a headend which is usually connected to several nodes which provide content to a cable modem termination system (CMTS) containing several receivers, each receiver connects to several modems of many subscribers, e.g., a single receiver may be connected to hundreds of modems. In many instances several nodes may serve a particular area of a town or city.

The hybrid fiber coaxial (HFC) network and CATV market is driving toward highest density transport as well as having flexible capability to transmit QAM signal in a cost effective matter. Multi transmitters, such as quadrature amplitude modulation (QAM) & dense and coarse wavelength division multiplexed (DWDM) & (CWDM) CATV transmitters, are gathered next to each other. Each transmitter typically transmits at a specific single wavelength channel of the DWDM, e.g., up to 40 wavelengths on the ITU grid with a 100 Ghz (0.8 nm) spacing. All these wavelengths typically are combined on a single fiber in order to increase fiber usage and reduce cost.

The typical analog CATV optical transmitter is constructed as a single module or circuit board. Each module generally contains a single wavelength laser which provides one channel, and as many as 40 channels (e.g. 40 transmitter boards) are provided in a headend unit. A cable operator generally needs to maintain an extra board for each channel to replace a transmitter board when it becomes defective or to simply change the channel parameters, such as transmission frequency. The transmitter boards are bulky and expensive, and are often individually built and tuned. Accordingly, what is needed is a small form factor pluggable optical CATV transmitter which takes up much less space, can be easily replaced, and is cost effective. Furthermore, with the increasing demand for more data bandwidth to be available to subscribers, many HFC networks are attempting to provide more bandwidth by pushing the optical fiber deeper into the network to bring the point at which the optical communications are converted to RF communications over a coaxial cable closer to the end user. Therefore new cost effective platforms of optical transmitters are needed to transmit data from remotely located end user subscribers and/or nodes back to the head end unit and vise versa.

SUMMARY OF THE INVENTION

This invention provides a small form factor analog CATV optical transmitter which.

An optical transmitter in accordance with the invention may be contained in a housing, and the optical transmitter comprise: a laser configured to be modulated to provide an analog QAM modulated signal based on a RF data signal; a thermoelectric driver configured to control a thermoelectric device to control an operating temperature of the laser; and pre-distortion circuits configured to correct distortions associated with the RF data signal.

The optical transmitter may further comprise a power control circuit configured to control power in the laser and a microprocessor configured to receive instructions from a host external to the optical transmitter and configured to control the thermoelectric driver and the power control circuit. The optical transmitter may also further comprise an RF attenuator which is configured to attenuate the RF data signal, wherein the microprocessor is configured to control the RF attenuator. An RF amplifier which is configured to provide gain to the RF data signal may also be included in the optical transmitter.

The housing of the optical transmitter may include a pin connector which is configured to mate with a pin connector on a host device when the optical transmitter is mounted in the host device. The housing may include a latch which is configured to secure the optical transmitter when mounted in the host device. The housing may include a handle which is configured to engage and disengage the latch with the host device. The housing may also include an optical connector receptacle configured to connect to an optical fiber. The housing may have dimensions of: height at approximately 8.6 mm, width at approximately 13.7 mm, and depth at approximately 56.6 mm.

An optical transmission unit in accordance with the invention may be contained in a housing, and the optical transmission unit may comprise: a plurality of ports configured to receive an optical transmitter in a housing, the optical transmitter including: a laser configured to be modulated to provide an analog QAM modulated signal based on a RF data signal; a thermoelectric driver configured to control a thermoelectric device to control an operating temperature of the laser; and pre-distortion circuits configured to correct distortions associated with the RF data signal.

In the optical transmission unit the plurality of ports may include any number of ports, such as 16, 32, 40, etc. The optical transmitter may include a microprocessor configured to receive instructions from the optical transmission unit and configured to control the thermo-electric driver. The optical transmitter may include an RF attenuator which is configured to attenuate the RF data signal.

The optical transmission unit may further comprise a pin connector which is configured to mate with a pin connector on the optical transmitter. The housing of the optical transmission unit may include a notch which is configured to mate with a latch on the housing of the optical transmitter.

The small form factor of the optical transmitter provides a cost effective solution. Since the operator can densely pack many (e.g. 40) optical channels in a single optical transmission unit, the operator can transmit QAM data in a very efficient manner, such as with low cost and high data capacity per chassis volume. The pluggable nature of the optical transmitter also allows an operator to easily remove and swap one optical transmitter for another in event of a desired channel change or a damaged optical transmitter by just removing the optical transmitter from the host module cages. The invention also allows the operator of the HFC network to combine multiple optical transmitters in a smaller host module which resides at the head end or at the hub or at the node to transmit data at many different wavelengths from the same host module.

BRIEF DESCRIPTION OF THE DRAWINGS

The following drawings serve to illustrate the principles of the invention.

DETAILED DESCRIPTION OF THE INVENTION

The invention provides for a small form pluggable analog optical transmitter, which may perform Quadrature Amplitude Modulation (i.e. QAM). The pluggable transmitter may plug into ports of a headend host module, or nodes in the HFC network, and may be used to transmit QAM data through different lengths of single mode fiber. The invention gives the user the flexibility to choose the desired transmitting channel (wavelength), distance, and cabling on a port by port basis. The invention provides a cost effective QAM transmission with great operator system control. The small form optical transmitter may use the mechanical dimensions of existing components, such as dimensions specified in the multi source agreement of the small form pluggable synchronous optical network (SONET)/synchronous digital hierarchy (SDH) telecom transceivers.

Figure 1:
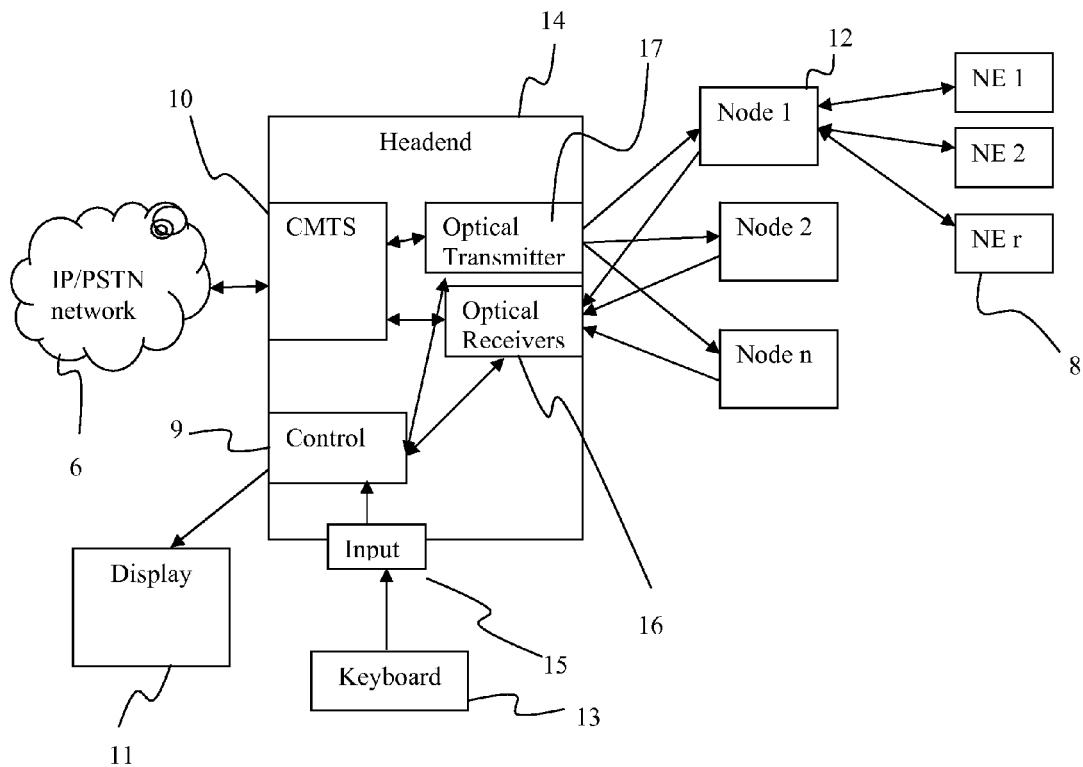
FIG. 1 illustrates an exemplary network in which the present invention may operate.

FIG. 1 illustrates an exemplary network in which the present invention may operate. As illustrated in FIG. 1, an exemplary network may include a plurality of terminal network elements 8 (e.g. cable modems, set top boxes, televisions equipped with set top boxes, or any other element on a network such as an HFC network) connected to a cable modem termination system (CMTS) 10 located in a headend 14 through nodes 12 and one or more taps (not shown). In an exemplary arrangement, headend 14 also contains a plurality of optical transmitters 17 which provide downstream optical communications through an optical fiber to the plurality of nodes 12, and an optical receiver 16 which provides upstream optical communications from nodes 12 to the headend 14. The CMTS 10 connects to an IP or PSTN network 6. Those of skill in the art will appreciate that there may be a plurality of nodes 12 connected to a headend, and a headend may contain a plurality of CMTS units, each of which contain a plurality of RF receivers (e.g. 8 receivers) each of which communicate with the optical transmitters 17 and receivers 16 to communicate with a plurality (e.g. 100 s) of network elements 8. Those of skill in the art will also appreciate that optical transmitters 17 and optical receivers 16 are illustrated separately for discussion purposes and may be integrated into one unit.

As illustrated in FIG. 1, a controller 9 allows an operator to control parameters of optical transmitters 17 and optical receivers 16. The operator may provide instructions to controller 9 through input 15 using any conventional techniques, such as with keyboard 13, remotely through a wireline or wireless interface, or through a removable storage device carrying instructions. Input 15 may also include an Ethernet input which allows a remote operator to provide real-time system monitoring and instructions to controller 9. Preferably, controller 9 is configured to determine or receive parameters associated with optical transmitter 17 and optical receiver 16 and provide the parameters to display 11. The operator may view the current power level of a transmission channel on display 11 and provide instructions to change the power level of a particular channel.

Figure 2:
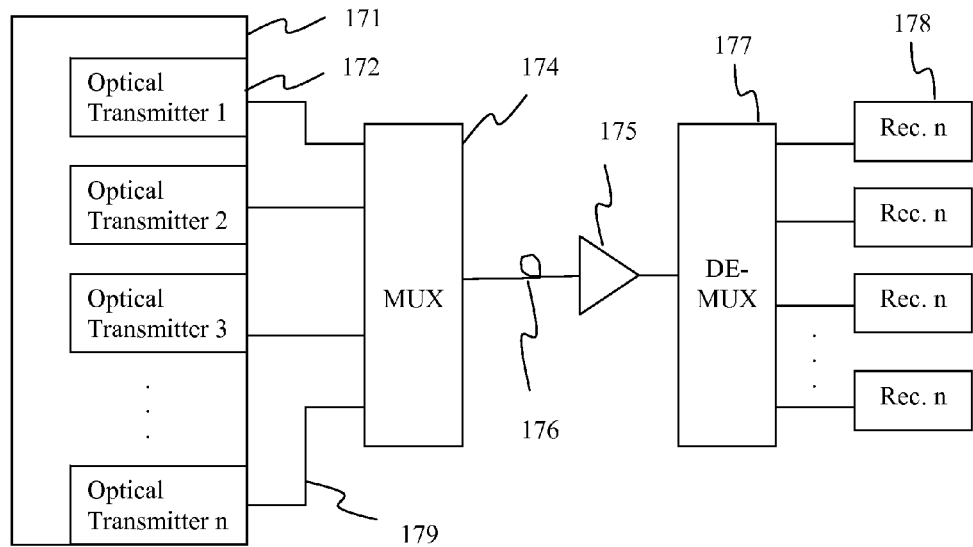
FIG. 2 illustrates an optical transmitter unit in an exemplary communication system.

FIG. 2 illustrates an optical transmitter unit in an exemplary communication system. Optical transmitter unit 171 may be one of several optical transmitter units contained in optical transmitters 17 of FIG. 1. As illustrated in FIG. 2, optical transmitter unit 171 preferably contains a plurality of optical transmitters 172, each of which transmits an optical signal on a separate frequency (or wavelength) over optical fiber 179 so that each transmitter provides a communication channel to a node 12. The plurality of optical signals are combined together by multiplexer 174 to be carried on a single optical fiber 176 to an erbium doped fiber amplifier (EDFA) 175 and a demultiplexer 177, which may be a distance of over 60 Km.

Demultiplexer 177 preferably separates the combined optical signals to provide the respective communication channels to optical receivers 178. Those of skill in the art will appreciate that the optical receivers 178 may be contained in nodes 12, at which point the communication channels may be provided as RF communications signals to network element 8. Alternatively, the receivers 178 may be at the user's premises and an RF conversion of the communication channel may occur at the user's premises prior to network element 8 or within network element 8.

Figure 3:
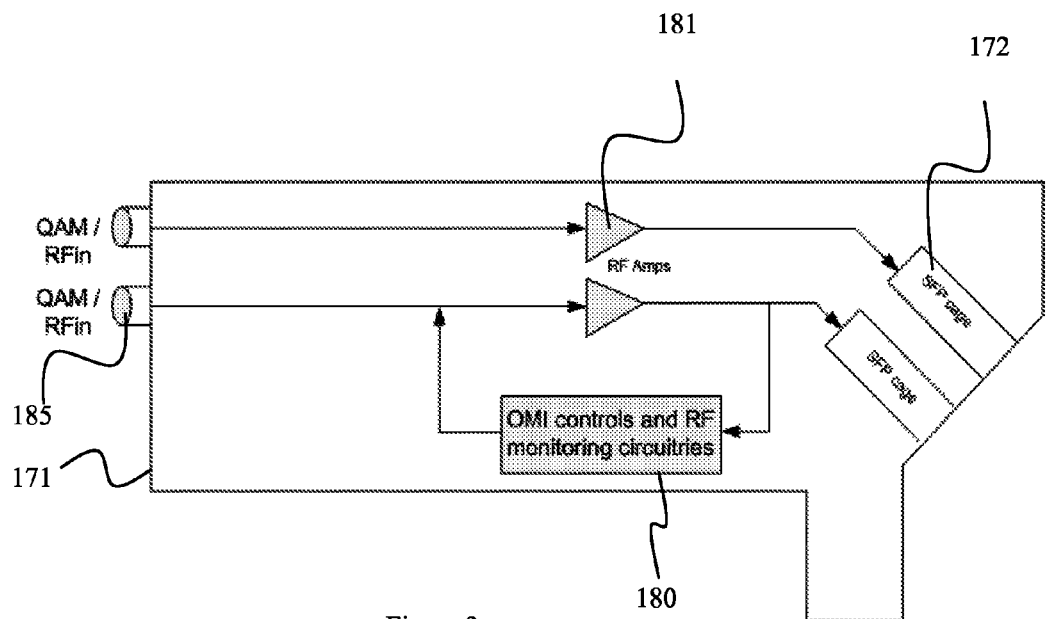
FIG. 3 illustrates the usage of SFQP transmitter configuration 2 in a host module.

FIG. 3 illustrates an exemplary optical transmission unit 171 in greater detail. As illustrated in FIG. 3, optical transmission unit 171 may be in the form of a card which may be inserted in a slot in the headend. Optical transmission unit 171 preferably contains a plurality of QAM/RF inputs 185 which may receive signals from CMTS 10, and a plurality of laser optical transmitters 172. The RF signals are preferably provided through RF amplifiers 181 to optical transmitters 172. An optical modulation interface (OMI) and RF monitoring circuits may control the RF levels and modulation of the laser in optical transmitters 172. Those of skill in the art will appreciate that a laser in optical transmitter 172 provides an optical signal at a specified fixed frequency which is modulated to carry the communication signals provided from CMTS 10.

Figure 4:
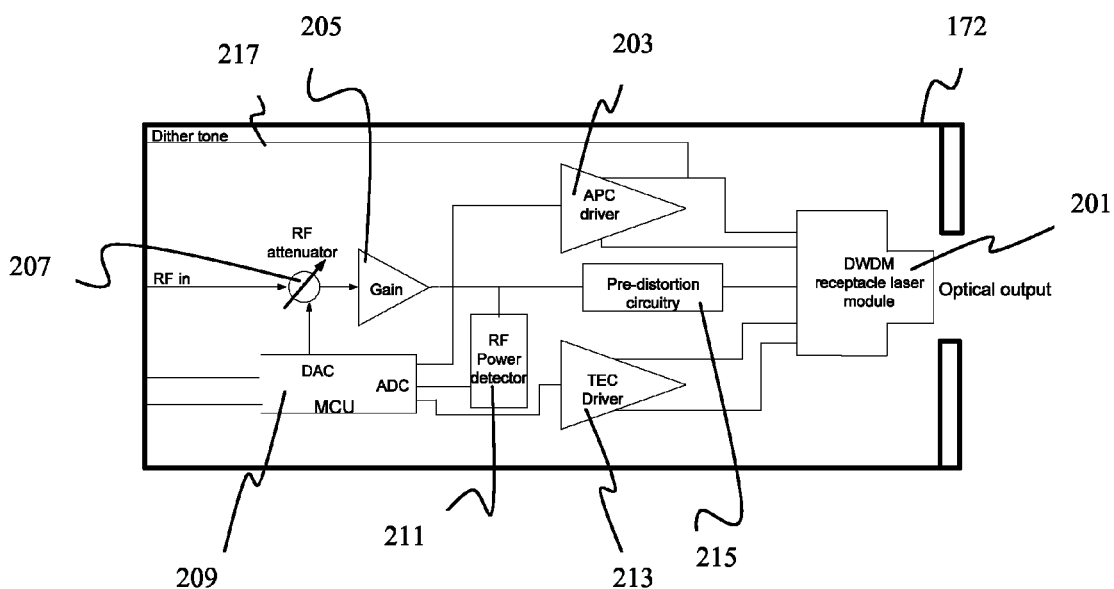
FIG. 4 illustrates a first exemplary configuration of a small form factor pluggable analog optical transmitter.

FIG. 4 illustrates an exemplary circuit of an optical transmitter in accordance with the principles of the invention. As illustrated in FIG. 4, the invention includes a directed modulation laser 201, such as a laser modulated to provide DWDM, and a TEC driver 213 to set and maintain the laser temperature and the operating channel wavelength. Also included is an automatic power control circuitry (APC) 203 to set bias current and maintain constant output optical power, amplitude controller of the dither tone 217, a microcontroller 209 to control RF attenuation circuitry 207, the bias current, and the TEC driver 213. The microcontroller 209 may also provide serial ID data and digital monitoring for the output optical power, Itec and IBias current, etc. and provide data communication needed with the outside host module, such as transmission unit 171. An RF gain stage 205 with an RF attenuation capability at RF attenuator 207 is preferably used to set the optical modulation index level of the laser transmitter 201. An exemplary RF attenuator is discussed in related application titled "Method And Apparatus For Controlling Channel Power Level In A Multi Channel System", attorney docket no. BCS04310 filed on Oct. 24, 2006, herein incorporated by reference in its entirety.

Laser 201 may be any suitable laser for optical communications, such as a continuous wave (CW) laser which may be directly modulated to provide the communication signal. Preferably, laser 201 is a high power laser with low chirp and acceptable analog linear performance, e.g. noise power ratio (NPR) of 40/9 or more, or a modulation error ratio (MER) of 35 dB or more. For example, a 1.5 µm cooled DFB 10 mW laser may be used, and may be a digital or analog laser. Laser 201 is preferably in the form of a laser diode contained in a transmitter optical subassembly (TOSA), which contains various components associated with the laser operations, such as a thermistor to monitor the laser temperature, a photodetector, a impedance matching resistor and a thermoelectric cooler (TEC) to cool the laser in response to instructions from TEC driver 213. A suitable laser is a CW laser manufactured by NEC Electronics with model no. NX8530NH.

As illustrated in FIG. 4, an RF signal received from CMTS 10 is provided to RF attenuator 207 where the amplitude level of the RF signal is attenuated to a desired level. The attenuated RF signal is provided to an amplifier 205 which may increase the amplitude by providing gain. Pre-distortion circuitry 215 preferably corrects for distortions, such as low frequency noise rise (LFNR), composite second order (CSO), composite triple beat (CTB) and cross modulation distortions, associated with the RF signal to provide the desired modulation of laser 201. Microcontroller 209, illustrated with a digital to analog converter (DAC) controls the RF attenuator 207, bases on the power detected by RF power detector 211. Microcontroller 209 also controls TEC driver 213 which controls a thermo-electric cooler (not shown) which controls the temperature of laser 201. A dither tone 215 with amplitude level control may be imposed on laser 201.

Figure 5:
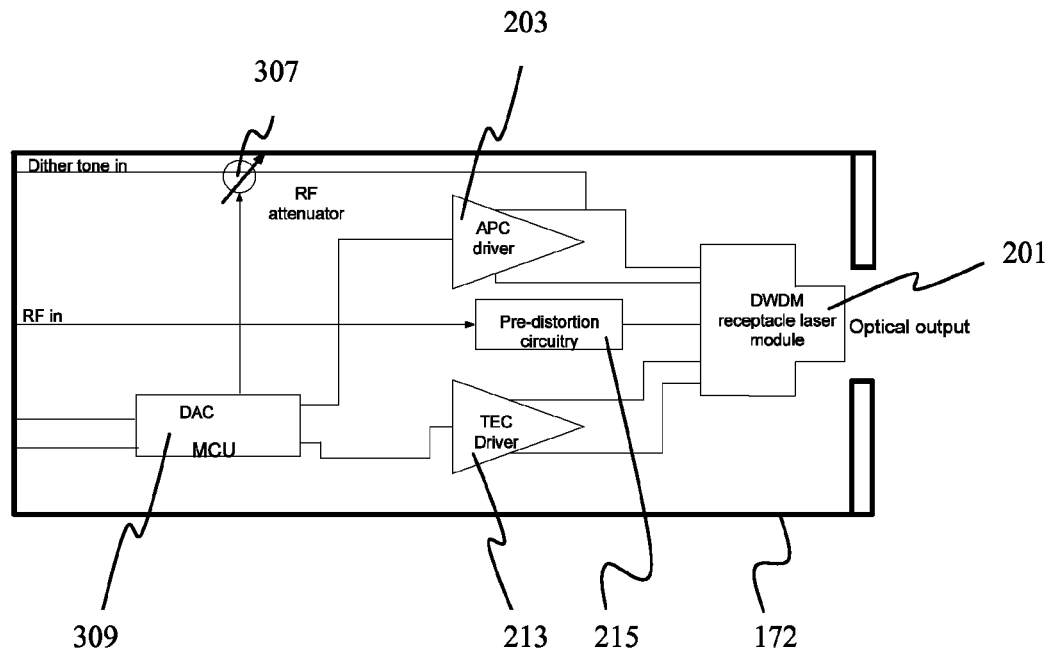
FIG. 5 illustrates a first exemplary configuration of a small form factor pluggable analog optical transmitter.

FIG. 5 illustrates an alternative implementation of optical transmitter 172. As shown in FIG. 5, the implementation is similar to that of FIG. 4, except that the RF gain stage 205 and RF power detector are removed from optical transmitter 172, and are preferably placed at transmission unit 171. A microcontroller at the host module can communicate with the optical transmitter 172 and transfer serial ID and monitoring data. This alternative implementation may allow a higher level of OMI and pluggable tuned optics (TOSA) with all its electrical/optical parameters.

Optical transmitter 172 preferably has low parasitic capacitance due to its short length and therefore it can achieve higher bandwidth and therefore provides capability of transmitting, for example, 256 QAM data or higher at distances of 100 Km or more over a single mode fiber in a small form pluggable cost effective design. The optical transmitter 172 is preferably capable of transmitting QAM modulated optical signal at output optical power up to 10 mw, for DWDM or CWDM system spacing for 1.5 and 1.3 µm application, also the design is preferably capable of monitoring bias current (i.e. Ibias), TEC current (i.e. ITec), and transmitted optical power.

Figure 6:
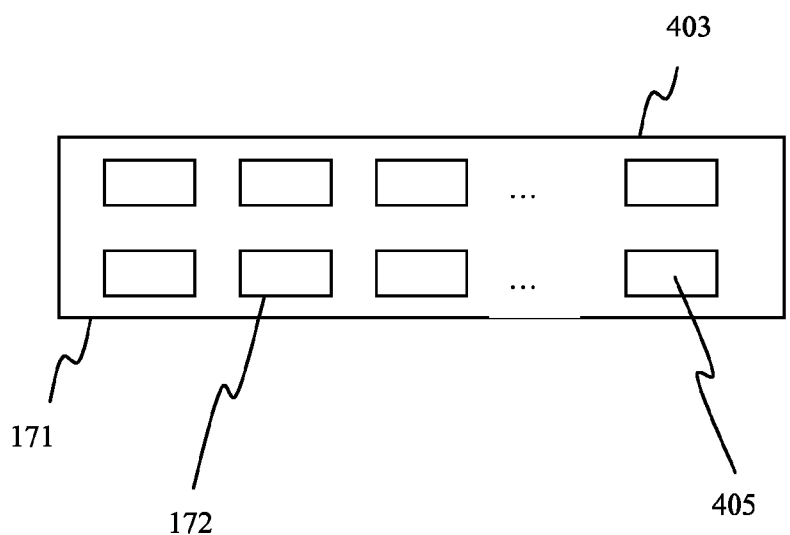
FIG. 6 illustrates a host module with multiple ports, each port may connect to a small form analog optical transmitter.
Figure 7:
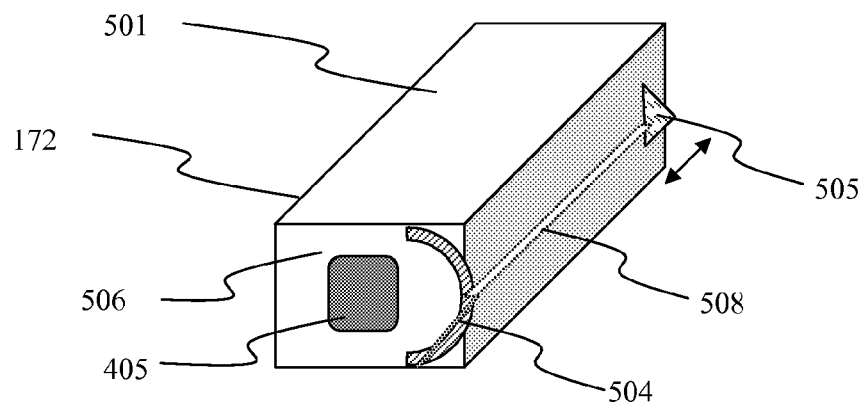
FIG. 7 illustrates a frontal view of an exemplary small form analog optical transmitter in accordance with the present invention.
Figure 8:
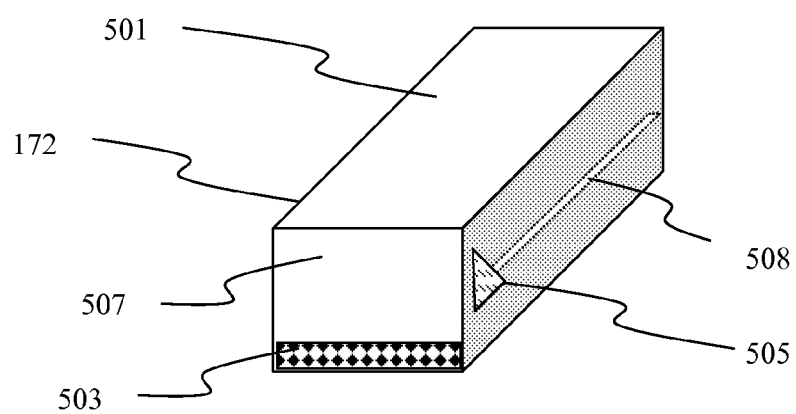
FIG. 8 illustrates a rear view of an exemplary small form analog optical transmitter in accordance with the present invention.

As illustrated in FIGS. 6-8, another important feature of the invention is allowing the user to fit many optical transmitters 172 on one small transmission unit 171 as a host module (FIG. 6), increasing the baud rate and transmitted information through the fiber. As illustrated in FIG. 6, a plurality of optical transmitters 172 may be housed in a housing 403 of transmission unit 171 by being inserted into receptacles 405. Housing 403 may be secured to a headend unit 10 by insertion into a slot on headend 14 (not shown). As illustrated in FIG. 6, optical transmitters 172 preferably contain a receptacle for easy cabling with fiber optic lines as known to those of skill in the art, such as LC or SC type receptacles, or optical transmitter 172 may contain a pig tail optical connector (a short length of optical fiber projecting from it).

FIG. 7 illustrates a frontal view of optical transmitter 171 contained in a housing and FIG. 8 illustrates a rear view of optical transmitter 171 contained in a housing. As illustrated in FIGS. 7 and 8, optical transmitter 172 is preferably configured in a housing 501 that can be readily inserted and removed in a receptacle in transmission unit 171. In the preferred implementation, optical transmitter 172 may be secured when inserted in transmission unit 171 by a bay latch 505 which engages with a notch on the housing of transmission unit 171 (not shown). Bay latch 505 may be actuated in a swinging motion or an in-out motion by an actuator rod 508 which connects to a handle 504, and moves bay latch 505 when handle 504 is moved. Handle 504 may also be used to enable an operator to pull optical transmitter 172 out of the receptacle in transmission unit 171. In operation, pressing handle 504 against front face 506 of optical transmitter housing 501 preferably engages latch 505 with optical transmission unit housing 403 to securely hold the optical transmitter 172. When handle 504 is pulled, such as when the arched end is rotated away from face 506 of housing 501, latch 505 is preferably disengaged, allowing optical transmitter 172 to be removed from transmission unit housing 403. While an arched shaped handle is illustrated for discussion purposes, those of skill in the art will recognize that any suitable handle shape may be used, including an irregular shaped handle. Those of skill in the art will appreciate that the invention allows an operator the capability to quickly and easily swap transmitters and change transmitter channels on a port by port basis.

As illustrated in FIG. 8, a rear face 507 of optical transmitter housing 501 preferably contains a pin connector 503 which mates with a pin connector in optical transmission unit housing 403. Pin connector 503 may include a pin connector with any number of pins, such as a 20 pin electrical connector, or may include for example, a SFP XCVR edge connector. Control information, RF data signals and like are preferably provided to the optical transmitter 172 from the transmission unit 171 as the host module.

The optical transmitter 172, may utilize mechanical dimensions which allow it to utilize existing packages or replace existing structures. For example, the optical transmitter 172 may use the dimensions of the SFP telecom transceivers specified in the SFP multi source agreement (MSA), e.g. (H×W×D)=8.6×13.7×56.6 mm. The transmission unit 171, as a host module at the head end could be designed to hold 16, 32, 40, etc. of the optical transmitters 172. Those of skill in the art will appreciate that use of a large number of optical transmitters 172 in a transmission unit 171 not only uses an operator's available space more efficiently, it also increase the transmission data capacity by providing the operator the ability to transmit all DWDM wavelength channels using a single host module panel that fits the large number of optical transmitters 172.

The small form factor of the optical transmitter 172 provides a cost effective solution. Since the operator can densely pack more than 40 optical channels in a single optical transmission unit, the operator can transmit QAM data in a very efficient matter, such as with low cost and high data capacity per chassis volume. The pluggable nature of the optical transmitter 172 also allows an operator to easily remove and swap one optical transmitter for another in event of a desired channel change or an optical transmitter becomes defective or damaged by just removing the optical transmitter from the host module cages. The invention also allows the operator of the HFC network to combine multiple optical transmitters in a smaller host module reside at the head end or at the hub or at the node to transmit data at many different wavelengths from the same host module.

What is claimed is:

1. A headend host module for transmission from a headend to a node in a cable network of a plurality of wavelengths from the single headend host module over a single optical fiber, the headend host module having an optical transmission unit in a housing adapted for insertion in to at least one of the headend or the node in the cable network, the headend host module comprising:

a plurality of radio frequency (RF) inputs for receiving RF signals from a cable modem termination system (CMTS) in the cable network;

a plurality of ports in the optical transmission unit for designating transmitter channels on a port by port basis, each of the plurality of ports configured to receive a pluggable optical transmitter operating at a separate wavelength over an optical fiber, each of the received pluggable optical transmitters having a laser configured to be modulated to provide a quadrature amplitude modulation (QAM) modulated optical signal based on at least one of the RF data signals received at the respective pluggable optical transmitter from the CMTS, a plurality of electrical connections provided between the headend host module and each of a plurality of received pluggable optical transmitters, each electrical connection for providing instructions from the headend host module to each received pluggable optical transmitter for controlling a respective optical transmitter laser;

a plurality of communication channels provided by the plurality of received pluggable optical transmitters for transmitting QAM modulated optical signals, each QAM modulated optical signal output over an optical fiber from a respective received pluggable optical transmitter having a respective frequency; and a multiplexer for multiplexing the QAM modulated optical signals output from the plurality of received pluggable optical transmitters for transmission from the headend to the node in the cable network of the plurality of wavelengths from the single headend host module over the single optical fiber.

2. The headend host module of claim 1, one or more of the optical transmitters in the optical transmission unit further comprising a power control circuit configured to control power in the laser.

3. The headend host module of claim 2, one or more of the optical transmitters in the optical transmission unit further comprising a microprocessor configured to receive instructions from the headend host module for controlling the power control circuit.

4. The headend host module of claim 3, one or more of the optical transmitters in the optical transmission unit further comprising an RF attenuator which is configured to attenuate the at least one of the received RF data signals, wherein the microprocessor is configured to control the RF attenuator.

5. The headend host module of claim 4, one or more of the optical transmitters in the optical transmission unit further comprising an RF amplifier which is configured to provide gain to the at least one of the received RF data signals.

6. The headend host module of claim 1, wherein each of the plurality of ports in a headend host module housing includes a pin connector configured to mate with a pin connector on a pluggable optical transmitter when the optical transmitter is mounted in the headend host module in a respective port.

7. The headend host module of claim 6, wherein one or more of the pluggable optical transmitters includes a latch which is configured to secure the respective optical transmitter when mounted in the headend host module.

8. The headend host module of claim 7, wherein one or more of the pluggable optical transmitters includes a handle which is configured to engage and disengage the latch with headend host module device.

9. The headend host module of claim 6, wherein one or more of the pluggable optical transmitters includes an optical connector receptacle configured to connect to an optical fiber.

10. The headend host module of claim 1, wherein one or more of the pluggable optical transmitter has dimensions of: height at approximately 8.6 mm, width at approximately 13.7 mm, and depth at approximately 56.6 mm.

11. The optical transmission unit of claim 1, wherein the one or more of the optical transmitters includes a microprocessor configured to receive instructions from the optical transmission unit and is configured to control a thermo-electric driver in the respective optical transmitter.

12. The optical transmission unit of claim 1, wherein each of the received pluggable optical transmitter includes an RF attenuator which is configured to attenuate the at least one of the RF data signals received at the optical transmitter.

13. The optical transmission unit of claim 1, further comprising a pin connector which is configured to mate with a pin connector on each of the received pluggable optical transmitters.

14. The optical transmission unit of claim 13, wherein an optical transmitter unit housing includes notches configured to mate with latches on a housing of each of the received pluggable optical transmitters.

15. The optical transmission unit of claim 1, wherein at least one optical transmitter laser has a noise power ratio of 40/9 or more.

16. The optical transmission unit of claim 1, wherein at least one optical transmitter laser has a modulation error ratio of 35 db or more.

17. The optical transmission unit of claim 1, wherein at least one optical transmitter laser is a 1.5 μm cooled DFB 10mW laser.

* * * * *